United States Patent Office 3,337,444
Patented Aug. 22, 1967

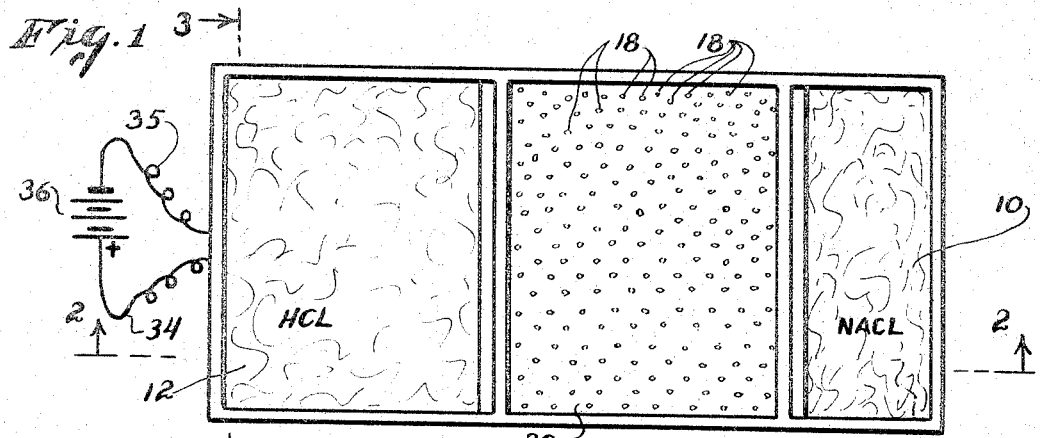
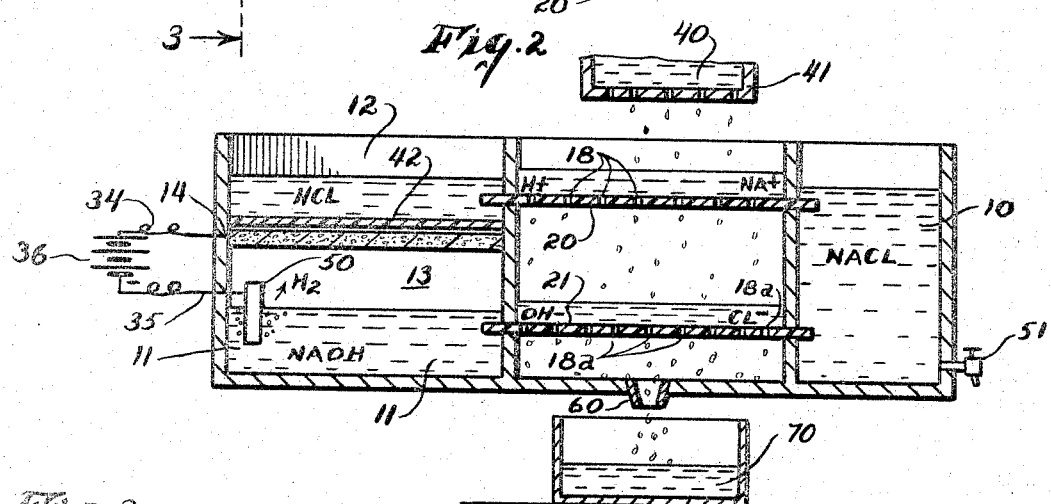
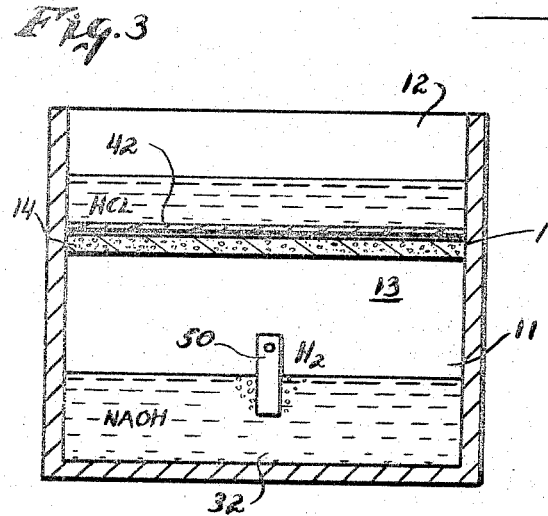

3,337,444
ION EXCHANGE APPARATUS FOR THE
MODIFICATION OF LIQUIDS
Laurence Meyers, Rego Park, N.Y.
(3736 High Vista Drive, Dallas, Tex. 75234)
Filed Dec. 28, 1962, Ser. No. 248,027
5 Claims. (Cl. 204—257)

This is a continuation-in-part of my co-pending application, Ser. No. 166,750, filed Jan. 17, 1962, for a Means for Transfer of Ions, now Patent No. 3,274,095.

This invention is generally in the art of altering chemical compositions by means of a transfer and exchange of ions under the influence of an electric current.

Much of the world's water supply contains dissolved salts, such as sodium chloride. This renders the water unfit for drinking. There is great need, therefore, for an efficient and inexpensive method of desalination.

It is known to utilize ion exchange materials to effect such treatment. Such methods, however, are expensive in that they will require relatively large quantities of chemical regenerants. After the said ion exchange materials have become exhausted because of the contact with the saltwater, they must be regenerated by relatively expensive chemicals and equipment. Thus, it will be seen that it will not be commercially feasible to utilize such processes.

In my prior co-pending application, a device, an apparatus and method, was described utilizing an ion exchange mat such as for the purpose of desalinating water.

When salts are dissolved in water, they disassociate into tiny electrically charged particles known as ions. For example, if ordinary table salt (sodium chloride) is dissolved in water, the sodium will disassociate from the chloride forming positively charged sodium ions and negatively charged chloride ions. The positively charged ions are known as cations, and the negatively charged ions are known as anions. The anions will have a tendency to be attracted to anodes (positively charged electrode) and the cations will have a tendency to be attracted to a cathode (negatively charged electrode).

It is well known to prepare ion exchange materials for such processes as for materials recovery and water purification, in sheet-like or membrane form. A perm-selective membrane is one which when subjected to a potential gradient, permits passage of cations to the exclusion of anions, or vice-versa. A membrane which permits the passage of cations, is called a cation-permeable membrane. A membrane which permits the passage of anions, is called an anion-permeable membrane. An ion exchange mat is made from ion exchange material as set forth above in sheet-like form, with a plurality of openings to allow fluid to flow therethrough. When a potential gradient is impressed across its ends, the mat may effect a transfer of ions with the fluid.

My prior device, which accomplished the desired result in several separate steps, of necessity produces by-products which may or may not be of value and utilized quantities of electrical energy.

It is a cardinal object of this invention, therefore, to provide an apparatus and method for modifying chemical compositions such as saltwater which will use comparatively little electricity and will not create by-products.

A still further object and accomplishment of the invention described herein is a method and apparatus that will be economical, convenient and efficient for the purpose of converting saltwater to potable water.

An ancillary object of this invention is to provide a new method for the utilization of ion exchange materials for the conversion of certain chemical compounds.

With these objects in view, the invention consists of the novel features of construction and arrangement of parts which will appear in the following specification and recited in the appended claims, reference being had to the accompanying drawings in which the same reference numerals indicate the same parts throughout the various figures and in which:

FIG. 1 is a top plan view of one embodiment of the invention with certain of the parts illustrated primarily diagrammatically.

FIG. 2 is a sectional elevational view taken substantially along line 2—2 of FIG. 1.

FIG. 3 is a sectional elevational view on an enlarged scale taken substantially along line 3—3 of FIG. 1.

Referring to the figures, there is illustrated a simplified embodiment of the invention.

It will be noted that certain of the features of the construction of the device are not shown or described in detail as they will be relatively conventional and may assume any well known form.

Essentially, the device will include a plurality of fluid chambers interconnecting and spaced to perform a unique function.

One of the said fluid chambers 10 will contain a solution such as sodium chloride.

Spaced from the fluid chamber 10 a predetermined distance will be adjacent fluid chambers 11 and 12 separated by a unique partition 14 to be described in detail hereinafter. In the embodiment of the invention depicted, the fluid chamber 12, which may contain a fluid such as hydrochloric acid, is positioned immediately above the fluid chamber 11, which may contain a fluid such as sodium hydroxide. One of the functions of the partition 14 will be to prevent the free exchange of the fluids in the chambers 11 and 12.

Operably connecting the chambers 10 and 11 and chambers 10 and 12 will be ion exchange mats of perm-selective ion exchange porous membranes 20 and 21. Such a mat will, when subjected to a potential gradient, permit the passage of cations to the exclusion of anions or vice-versa. A cation is a positively charged ion, or one which will tend to be attracted by a cathode. They are designated in the drawings herein by a plus sign placed above and behind the atomic symbol. An anion is a negatively charged atom or one which will be attracted to an anode. They are designated herein by a minus sign placed above and behind the atomic symbol. The mat which permits the passage of cations, is called a cation-exchange mat. A mat which permits the passage of anions, is called an anion-exchange mat. Connecting fluid chamber 10 to fluid chamber 11 will be an anion-exchange mat 21. Connecting the fluid chamber 10 to the fluid chamber 12 will be a cation-exchange mat 20.

Referring particularly to FIG. 2, it will be seen that the ion exchange mats 20 and 21 will extend through a portion of the walls and partially into appropriate fluid chambers in a leakproof manner. Thus, mat 21 will extend partially into fluid chamber 10 and partially into fluid chamber 11. Similarly, mat 20 will extend partially into fluid chamber 10 and fluid chamber 12.

The partition 14 separating the fluid chambers 11 and 12 will be described in reference to FIGS. 2 and 3. The said partition 14 will be constructed as a charged porous plate of material such as carbon impregnated with platinum, electrically connected by a conductor 34 to a power supply source 36. A cation permeable membrane 42 may be positioned directly above the partition 14 to prevent the chlorine ions in the hydrochloric acid immediately above the said partition 14 from reaching the partition and thereby allowing the hydrochloric acid to decompose.

An electrically charged cathode 50 is placed within the sodium hydroxide within chamber 11. The said cathode 50 may be charged by means of a conductor 35 connected to the power supply source 36.

The operation of this simplified embodiment of the invention will be as follows:

As mentioned heretofore, a sodium chloride solution is placed within fluid chamber 10, a sodium hydroxide solution and hydrogen gas thereabove in fluid chamber 11, and a hydrochloric acid solution in fluid chamber 12. Saltwater 40 in a reservoir 41 above the mats 20 and 21 will be allowed to seep through the said mats. The partition 14 and the cathode 50 will be electrically charged.

The sodium ions of the solution in chamber 11 will be attracted to the cathode 50. They will, therefore, absorb electrons and become free sodium. The sodium in turn will react with the water to again form sodium hydroxide and free hydrogen. The formula for this reaction is:

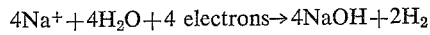

$$4Na^+ + 4H_2O + 4 \text{ electrons} \rightarrow 4NaOH + 2H_2$$

The hydroxyl ions of the sodium hydroxide in chamber 11 will be attracted to the mat 21 and will, therefore, tend to travel there along.

It will be seen from the portion of the invention above-described that the reaction in fluid chamber 11 will absorb four electrons, from conductor 35 and the power supply source 36.

The free hydrogen now contained in the upper portion 13 of chamber 11 above the level of the sodium hydroxide will contact the partition 14. This will then tend to pass through the porous platinum impregnated carbon electrode plate. In the said plate, the said free hydrogen will give off electrons as it passes therethrough thereby forming additional hydrogen ions in the hydrochloric acid solution above the partition 14 in chamber 12. The formula for this reaction is:

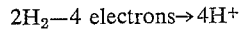

$$2H_2 - 4 \text{ electrons} \rightarrow 4H^+$$

Thus, the partition 14 will release electrical energy which may be passed through the conductor 34 to the power supply 36. As noted above, the reaction in fluid chamber 11 will absorb four electrons while the reaction in fluid chamber 12 will release four electrons.

These reactions will be self-sustaining in that theoretically additional electrical energy will not have to be supplied once the reaction commences. The released and absorbed electrons will tend to maintain the charge in the partition 14 and the cathode 50. In practice, of course, it is necessary to supply additional quantities of electrical energy to make up for any side losses. The power supply 36 is of additional importance. In order to maintain the speed of the reactions outlined herein at a required rate, it will be necessary to maintain a certain potential gradient between the partition 14 and the cathode 50. A minimum potential gradient would be maintained on a self-sustaining basis due to the reactions set forth therein. The power supply 36 increases the potential gradient, however, to a desired level wherein the reactions will proceed at the required rate.

Essentially, the combination of the partition 14, the cathode 50 and the chemicals utilized in combination therewith and described above, will constitute a fuel cell in that electrical energy is created by means of the transfer of ions. This novel concept regarding the production of electrical energy by means of a transfer and exchange of ions is deemed to be especially important to this invention.

The hydrogen ions produced as explained below in chamber 12, will tend to be attracted to the cation exchange mat 20 and will, therefore, tend to travel therealong.

The portion of the invention above-described therefore, has provided hydrogen ions at the cation exchange mat 20 and hydroxyl ions at the anion exchange mat 21.

The saltwater 40 in the chamber 41 will be allowed to pass through perforations 18 and 18a in the mat 20 and 21. The salt in the water will be disassociated into sodium ions and chloride ions. There will be, however, an exchange of hydrogen and sodium ions resulting from mat 20. The sodium ions will replace the hydrogen ions on the mat 20. The mat 20 in turn will release it hydrogen ions into the solution. The hydrogen ions thus released will tend to form hydrochloric acid within the solution 40. There will be a second reaction, however, resulting from the mat 21. The hydroxyl ions passing along the said mat 21 will be replaced by the chloride ions from the hydrochloric acid. The hydroxyl ions in turn will replace the chloride ions in the hydrochloric acid, thereby forming hydrogen hydroxide, which will, of course, immediately turn into pure water 70. The chloride ions on mat 21 and the sodium ions on mat 20 will continue to fluid chamber 10 where they will combine to form additional sodium chloride which may be occasionally bled off as through valve 51.

Of course, production units constructed according to this invention may have additional refinements to insure the complete conversion of the saltwater to pure water. A plurality of chambers operating as described herein, may be provided in adjacent relationship to convert large quantities of saltwater or may be stacked in successive relationships to insure that all of the salt is removed. Of course, the latter steps of such a repeated operation being merely refining steps will be able to handle larger quantities of water or conversely may be built smaller.

Electrical energy is created by partition 14 and used up by cathode 50. Desalted water will leave the apparatus at port 60. Water in chamber 11 is consumed and must occasionally be replaced. The salt solution in chamber 10 will eventually become concentrated and must be then diluted.

It will be seen that a device is herein described in a simplified fashion which will accomplish all of the objections previously set forth and others. Once reactions are commenced, little electrical energy will be required to continue the same.

While there are above disclosed but a limited number of embodiments of the structure and product of the invention herein presented, it is possible to produce still other embodiments without departing from the inventive concept herein disclosed and it is desired, therefore, that only such limitations be imposed on the appended claims as are stated therein, or required by the prior art.

Having thus described my invention and illustrated its use, what I claim as new and desire to secure by Letters Patent is:

1. An apparatus for the modification of liquids by ion exchange, including:
   (a) a first liquid chamber separated by vertical walls defining an exchange compartment from second and third liquid chambers,
   (b) and a first horizontal porous perm-selective ion exchange membrane passing through said exchange compartment and said vertical walls and interconnecting said first and said second liquid chambers,
   (c) and a second horizontal porous perm-selective ion exchange membrane passing through said exchange compartment and said vertical walls and interconnecting said first and said third liquid chambers,
   (d) said second and said third liquid chambers having a partition therebetween, said partition being fabricated of an electrically conductive porous material,
   (e) and electrical connection means between said partition and said second liquid chamber,
   (f) and means to conduct the liquid to be modified sequentially through said second and said first membranes in said exchange compartment whereby ion exchange may be effected.

2. An apparatus according to claim 1 wherein said first horizontal porous perm-selective exchange membrane is an anion exchange membrane and said second horizontal porous perm-selective ion exchange membrane is a cation exchange membrane.

3. An apparatus for the modification of liquids by ion exchange, including:
(a) a first liquid chamber for containing a sodium chloride solution separated by vertical walls defining an exchange compartment from second and third chambers, said second and third chambers being adapted to contain a sodium hydroxide solution and hydrogen gas, and a hydrochloric acid solution respectively, said third chamber being arranged above said second chamber,
(b) and a first horizontal porous perm-selective anion exchange membrane passing through said exchange compartment and said vertical walls and interconnecting said first and said second liquid chambers,
(c) and a second horizontal porous perm-selective cation exchange membrane passing through said exchange compartment and said vertical walls and interconnecting said first and said third liquid chambers,
(d) said second and said third liquid chambers having only an anode partition therebetween, said anode partition being fabricated of an electrically conductive porous material,
(e) and a cathode within said second liquid chamber electrically connected through a power supply to said anode partition,
(f) and means to conduct the liquid to be modified sequentially through said second and said first membranes in said exchange compartment whereby ion exchange may be effected.

4. An apparatus according to claim 3, further including a cation permeable membrane between said partition and said liquid in said third liquid chamber.

5. An apparatus according to claim 4, wherein said anode partition is a porous structure of carbon impregnated with platinum.

References Cited
UNITED STATES PATENTS 3,074,864   1/1963   Gaysowski _____ 204—151

JOHN M. MACK, *Primary Examiner.*

D. R. JORDAN, *Assistant Examiner.*